(No Model.)
P. B. DELANY.
ELECTRIC CABLE.
No. 247,321. Patented Sept. 20, 1881.
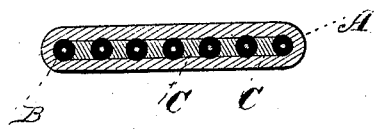
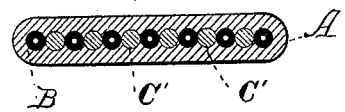
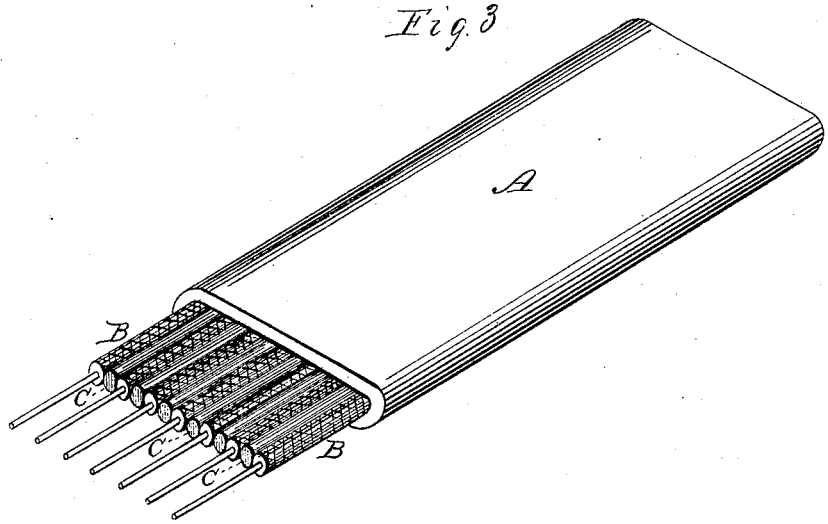
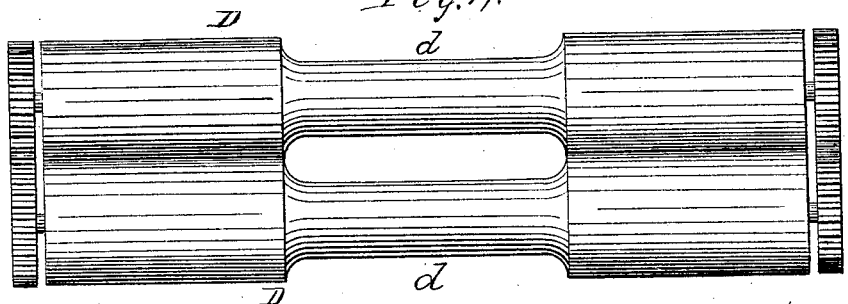
Witnesses
Phil W Hale
W B Hale
Inventor
Patrick B. Delany
by Fred W Royce
Attorney

UNITED STATES PATENT OFFICE.

PATRICK B. DELANY, OF NEW YORK, N. Y.

ELECTRIC CABLE.

SPECIFICATION forming part of Letters Patent No. 247,321, dated September 20, 1881.

Application filed July 16, 1881. (No model.)

*To all whom it may concern:*

Be it known that I, PATRICK B. DELANY, a citizen of the United States of America, residing at New York, in the county of New York and State of New York, have invented certain new and useful Improvements in Electric Cables; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement upon the electric cable which forms the subject of Letters Patent No. 242,894 granted to me on the 14th day of June, 1881, its object being to avoid the necessity of so great a force in the compression of the inclosing lead pipe as is required in the manufacture of said cable, in order to effect the complete separation of the wires by intervening lead walls; and, further, to obviate the corrugating of the lead pipe in order to force its flat walls into contact between the wires.

My present improvement consists in introducing into a flat lead pipe a series of insulated wires in practically the same plane, interposing between each wire and that adjacent a bare metallic wire, and compressing the cable so formed until the opposite sides of the bare wires are pressed against the opposite walls of the pipe, which are caused to partially embrace the wires; and, further, it consists in an electric cable composed of a series of insulated wires arranged in a flat lead pipe in practically the same plane, and separated by complete intervening walls of metal extending between and in contact with but not integral with or attached to the opposite walls of the pipe.

In the accompanying drawings, Figure 1 is a cross-section of a cable constructed according to my present improvement, with lead wires between the conducting-wires. Fig. 2 is a cross-section of a cable in which bare copper wires are used between the conductors. Fig. 3 is a perspective view of a portion of such a cable before compression, the conducting and lead wires projecting at one end. Fig. 4 is a view of a pair of rollers, such as used for compressing the cable.

The letter A designates the inclosing-pipe. This pipe may be molded flat orignally, or may be flattened from a round shape, as described in my above-mentioned Letters Patent.

B indicates the insulated wires, which may be covered with cotton, hemp, or other suitable insulating material.

The separating-wires C may be of any metal, and one is arranged between each two adjacent conducting-wires, as shown. The conducting and separating wires are introduced into the pipe by first blowing or otherwise passing through the pipe a smaller wire or cord, and then, by means of this cord or another and larger one drawn through by it, drawing the conducting and lead wires into place, either all together or separately. The conducting and lead wires being in place, the cable at this stage is drawn between the compression-rollers shown in Fig. 4, in which D indicates the rollers, which are geared together, as in my Letters Patent before referred to, and each provided with circumferential groove $d$, to receive half the cable flatwise, but of such size as to compress said cable and force the separating-wires C, when formed of lead, snugly in contact with the opposite walls of the pipe, and upset them in such manner as to cause their sides to partially embrace and condense the covering material of the adjacent wires, closing up all space around said wires, so that no air can remain in or find access to the interior of the cable after its compression.

When copper or other hard-metal wires are used as the separating-wires, as shown at C', Fig. 2, the opposite surfaces of the lead pipe are caused by the compression to partially embrace and enter between the conducting-wires B and separating-wires C', filling up the space and leaving no room for air.

Sections of the cable may be joined or spliced together, as described in my before-referred-to Letters Patent, or, after twisting together the bared ends of the wires of two adjacent cable-sections, I may wrap the bared splice with suitable insulating covering interposed between adjacent wire joints, pieces of metal, similar to the separating-wires, and then slip over the adjacent ends of the pipe a lead sleeve previously passed over the end of one of the cable-sections, to be in readiness. This sleeve and the entire joint should then be compressed by passing it between rollers with similarly-shaped but somewhat larger passes than those shown in Fig. 3. The metal pieces may be held in place temporarily by a block of wood placed under the joint, and removed as the sleeve is slipped into place.

What I claim is—

1. The method herein described of making lead-inclosed electric cables, the same consisting in arranging longitudinally in a flat lead pipe a series of insulated conducting-wires practically in the same plane, interposing between each conducting-wire and the next adjacent conducting-wire a bare or naked metallic wire and compressing the cable so formed until the opposite sides of the naked wires are pressed against the opposite walls of the pipe, which are caused to partially embrace the conducting-wires, substantially as and for the purpose set forth.

2. An electric cable composed of a series of insulated conducting-wires arranged in practically the same plane within a flat lead pipe, and separated by complete intervening walls of metal extending between and in contact with but not integral with nor attached to the opposite walls of the said lead pipe, substantially as described.

In testimony whereof I affix my signature in presence of two witnesses.

PATRICK B. DELANY.

Witnesses:
JOSEPH M. BULGER,
JAS. A. JAMESON.